Dec. 5, 1961    G. O. BRESSLER ET AL    3,011,477
MOLDED POULTRY NEST CUSHION AND PROCESS OF MAKING THE SAME
Filed Oct. 8, 1959
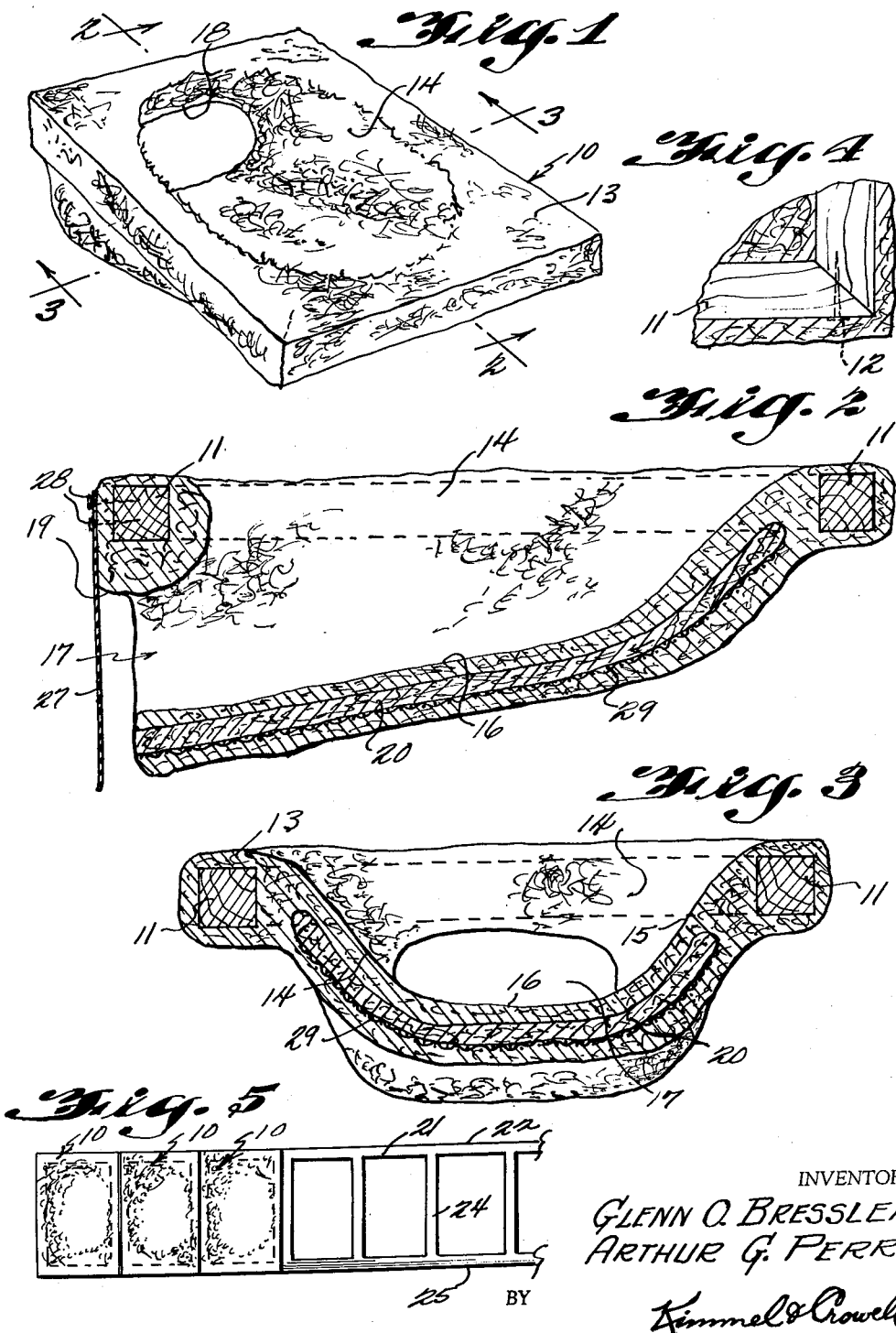
INVENTORS
GLENN O. BRESSLER
ARTHUR G. PERRY
BY
Kimmel & Crowell
ATTORNEYS 3,011,477
MOLDED POULTRY NEST CUSHION AND
PROCESS OF MAKING THE SAME
Glenn O. Bressler, 630 Franklin St., State College, Pa.,
and Arthur G. Perry, 203 Burncoat St., Worcester,
Mass.
Filed Oct. 8, 1959, Ser. No. 845,225
9 Claims. (Cl. 119—48)

This invention relates to a molded poultry nest cushion and process of making the same. A primary object of this invention is the provision of such a nest cushion which may be readily inserted in and removed from a laying enclosure, provided with means for releasing the egg from the nest immediately after the hen has laid it, into a collecting tray, or on a collecting apron.

An additional important object of the invention is the provision of such a nest which is attractive to a hen and will act as an inducement to enter the laying enclosure and lay the egg in the nest cushion.

An additional object of the invention is the provision of such a device which will tend to prevent egg breakage, which will keep the eggs clean, and which will hasten the cooling of the egg, by prompt conveyance to a collecting tray, as soon as it is laid.

Still another object of the invention is the provision of such a device which is extremely sturdy and durable in construction and which is provided with reinforcement to preclude the hens readily destroying the nest through scratching and pecking of the nest parts.

A further object of the invention resides in the provision of an improved process of molding such a poultry nest cushion.

As conducive to a clearer understanding of this invention, it may here be pointed out that hitherto numerous poultry nests or poultry nest cushions have been designed in an attempt to meet the foregoing objects. In general, the prior art practice has been to provide nest housing either singly or in multiples, with a nesting material comprising wood shavings, straw, pressed sugar cane, or other soft material placed in the bottom of the nest to a depth of two or three inches. These materials in a nest housing provide a natural attractiveness to laying hens. Excelsior nest pads, consisting of matted excelsior pasted to a paper base have also been used with the intent of preserving the attractiveness of the nesting material to the hen and, at the same time, keeping the nesting material bound together. In practice, with such a pad frequent replacement is necessary because the chickens tend to tear the pads apart and kick the excelsior out of the nest, or broken eggs soil the pad which necessitates the removal and replacement thereof. When loose nesting material is employed new material must be added at frequent intervals. A primary object of this invention is to provide a molded nest cushion which overcomes all of the foregoing difficulties.

The above mentioned type of nesting also provides several other serious drawbacks. Among these are the fact that replacement of the nesting material may become a substanital cost factor, while the labor required to add nesting material is likewise costly. In such a litter type nest, eggs accumulate in the nest until they are gathered manually which may occur three or four times daily. While the eggs are so accumulating they have no chance to cool because of successive hens sitting on the eggs. This does not help in maintaining high egg quality, and frequently results in breakage and soilage of the eggs. Another important object of the invention is the provision of a poultry nest cushion which obviates all of the foregoing disadvantages.

Efforts have also been made to provide a nest design which would release the egg from the nest immediately after being laid. These nests are customarily called "roll away" nests. The primary difference between this type of nest, and the loose nesting material previously described is that a sloping wire bottom replaces the nesting material. Eggs are then laid on the wire, which may or may not be coated with a plastic, and roll into a collecting tray, or on to an apron. Numerous difficulties have been encountered, however, with the wire bottom nest of this type. As illustrative of these difficulties, this type of nest is not as attractive as loose nesting material. The result is that a high percentage of eggs are laid on the floor, as compared with litter type nests. In addition to the fact that the floor eggs become dirty, which adds to egg cleaning cost, eggs laid in the wire bottom nests generally become wire marked, or pick up dirt while rolling down the sloping wire to the egg holding tray, which also results in increased cleaning costs. In addition there is a considerably higher breakage in eggs falling on a wire bottom, than in eggs falling on fabric or nesting material. It is a very important object of this invention, therefore, to provide a nest pad or cushion which combines the best features of both of these types of nests, while obviating the major disadvantages of each.

Still other objects reside in the combination of elements, arrangements of parts, and features of construction, as well as in the process of making the nest cushion, all as will be more fully described hereinafter and shown in the accompanying drawings wherein there is disclosed one embodiment of this inventive concept.

In the drawings:

FIGURE 1 is a perspective view of one form of poultry nest cushion or pad embodying features of the instant invention;

FIGURE 2 is an enlarged sectional view taken substantially along the line 2—2 of FIGURE 1 as viewed in the direction indicated by the arrows;

FIGURE 3 is an enlarged sectional view taken substantially along the line 3—3 of FIGURE 1 as viewed in the direction indicated by the arrows;

FIGURE 4 is an enlarged fragmentary sectional view of a constructional detail; and FIGURE 5 is a fragmentary view in top plan of a modified form of construction.

Similar reference characters refer to similar parts throughout the several views of the drawings.

Having reference now to the drawings in detail, the nest of the instant invention is generally indicated at 10, and is comprised preferably of a rectangular wooden frame 11, which is suitably cornered and connected as by dowels or nails 12 at the corners. The frame 11 is adapted to be overlain by a molded covering material which, broadly, consists of vegetable fibers with a bonding agent, all as will be more fully pointed out hereinafter, which is shaped in a mold. The top surface 13 of the nest cushion is substantially flat and is provided with an oval opening 14, of a configuration comfortably to accommodate the body of a hen. This oval depressed portion is provided with inclined side walls 15, and a bottom 16 which slopes downwardly and rearwardly to an opening 17, in a relatively straight wall 18 therein. At the back of the cushion adjacent the opening 17, the frame 11 and its associated covering components form an overhang 19, which is provided specifically to space the rear opening a relatively slight distance from the collection tray, in order that droppings which land on the floor of the nest and roll therefrom may fall into the space between the end 18 of the nest and the collection tray, the latter, which may be of any desired conventional type, not being shown.

If desired, as when stacked or tiered nests are employed, this space may be omitted and the back of the nest seated snugly against the collection tray or apron or its frame, a suitable slot being provided in the tray itself for this purpose. In this case the overhang 19 may be entirely omitted or reduced in extent until it merely provides a supporting flange for the rear of the nest cushion.

In the formation of the nest a layer 20 of reinforcing material, also to be more fully described hereinafter, is molded into the bottom of the device as shown in FIGURE 2, and extends upwardly a substantial distance along the sides thereof. Thus the reinforcing material is provided at the point where the greatest damage is normally done to the nest by the hens pecking and scratching during laying.

In order to prevent the hens pecking or scratching the eggs after they have rolled onto the collecting tray or apron, the opening 17 is so dimensioned as to permit a normal size egg to roll freely therethrough, but while necessarily of sufficient size to allow the passage of a hen's head and neck, is sufficiently small so as to preclude the simultaneous projection of the hen's feet therethrough, and also to restrict free pecking movement of the head of the hen.

In order to provide a further safeguard against damage to the eggs by the hen, a suitable flexible curtain 27 of any desired material may be suspended as by tacks 28 or the like from the overhang 19, loosely to cover the opening 17.

In practice is has been found desirable in certain circumstances to provide a removable insert in the central portion of the bottom of the nest, which is suitably secured thereto by adhesive or the like, in order to reduce still further replacement costs, since the insert is positioned at the point of greatest damage, and may be readily replaced, rather than replacing the entire nest cushion. While this feature is desirable in many instances, it is not essential to the inventive concept, which broadly comprises the nest cushion, its material and its configuration.

FIGURE 5 discloses a slightly modified form of construction, wherein a series of nests 10 substantially identical in configuration to that previously described are formed on a single frame, and molded as an integral unit. Any desired number of nests may thus be provided, and may be supported on a frame generally indicated at 21, which is provided with front and rear bars 22 and 23, and transverse spacing bars 24.

Obviously any desired supporting members may be provided for the nest cushions, which may be inserted into the supports from either the front or the rear in accordance with the particular type of laying enclosure, so that the collection trays or aprons may also be positioned to the front or the rear of the device as desired.

Having reference now to the material of which the nest cushion is constructed, it has been found that vegetable fibers, such as coir fiber, tula fiber, sisal, excelsior, moss palm fiber, animal hair, and various synthetic fibers are all desirable. These are bonded together in a mold by a bonding agent, such as natural rubber latex, neoprene, or a suitable synthetic resin.

The bonding is preferably effected in a mold with a density of approximately one and a half to two pounds for a conventional size mold, which is approximately twelve inches square and four inches deep. The bonding process and the molding involves curing the mass for approximately an hour at substantially 250° Fahrenheit to obtain a strong bond. Some resins may be cured at a greater or less temperature for a greater or less time, while some are merely allowed to harden without curing.

The fiber reinforcement 20 may also be of any desirable material but is preferably a punched or needled vegetable fiber reinforcement, which is not impregnated with the bonding agent, or which may be a suitable high density material, such as hardware cloth or the like, positioned between upper and lower layers of the bonded vegetable fiber. A firm backing material 29, such as wire or metal mesh or screening or other stiff substance may be provided, either completely surrounding the reinforcement 20 or interposed between either or both sides thereof and the adjacent layer of impregnated bonded fibre. By virtue of this arrangement, destruction of the nest by scratching and pecking is reduced to a minimum.

If desired, a suitable insecticide or vermicide may be incorporated in the bonding material during molding, or alternatively may be sprinkled on the finished article to prevent and control vermin, lice, mites and the like, in the nesting area.

By virtue of the arrangement of this invention, and the use of the molded poultry nest cushion herein described, under normal flock operation the percentage of eggs laid on the floor has been materially less than five percent. This is occasioned by the attractiveness of the nest to the hen, combining as it does all of the advantages of a natural or litter type nest, and the "roll away" wire type nest. By shaping the cushion as described, the egg is released from the nest immediately after it has been laid. By this arrangement approximately ninety percent of the eggs are clean when released, obviating the wire stains or dust marks, and the additional labor and handling for cleaning hitherto required with the wire bottom nests. By virtue of this apparatus egg breakage is substantially eliminated. Since the egg is immediately released from the nest to a tray, the egg can start cooling and thus retain a higher quality. The nest is so designed that under normal conditions of operation it will last for several years, thus eliminating the labor and expense common to the loose nesting material type of nest. When the nest of this invention becomes soiled, it can be brushed in its normal position or can be removed from the laying enclosure, washed and again placed back in operation.

Obviously the size of the nest cushion may be readily varied, to accommodate small or large chickens, or even turkeys if desired.

From the foregoing it will now be seen that there is herein provided an improved molded poultry nest cushion which accomplishes all of the objects of this invention, as well as a process for making the same, and which includes many advantages of great practical utility and commercial importance.

As many embodiments may be made of this inventive concept, and as many modifications may be made in the embodiments hereinbefore shown and described, it is to be understood that all matter herein is to be interpreted merely as illustrative and not in a limiting sense.

What we claim is:

1. A poultry nest comprised of a body of fibrous material impregnated with a bonding agent and having a rear wall and a central depression of a size to accommodate a laying hen, said depression having a bottom inclined rearwardly, and having its lowermost portion adjacent said rear wall and an opening in the rear wall of said body adjacent the lowermost portion of said inclined bottom adapted to allow an egg to roll into an adjacent collecting tray, said body having a rigid frame covered with said fibrous material formed internally thereof above and surrounding said central depression, said frame including a rearwardly extending top portion adapted to space said opening from the collecting tray to provide a space for droppings rolling down said inclined bottom, said lowermost portion being spaced inwardly from and directly beneath a central portion of said rearwardly extending top portion.

2. The structure of claim 1 wherein said fibrous material comprises a vegetable fiber taken from the group consisting of coir fiber, tula fiber, sisal, moss, and the palm fiber.

3. The structure of claim 1 wherein the fibrous material is a synthetic fiber.

4. The structure of claim 2 wherein the bonding agent is natural rubber.

5. The structure of claim 2 wherein the bonding agent is neoprene.

6. The structure of claim 2 wherein the bonding agent is a synthetic resin.

7. The structure of claim 2 wherein a vermicide is incorporated in said bonding agent.

8. The structure of claim 1 wherein said fibrous material comprises animal hair.

9. The structure of claim 1 wherein a flexible curtain is provided secured to the rear outer side of said extending top portion of said body spaced from and overlying said opening.

References Cited in the file of this patent

UNITED STATES PATENTS

| | | |
|---|---|---|
| 1,371,443 | Sels | Mar. 15, 1921 |
| 1,892,235 | Esch | Dec. 27, 1932 |
| 2,592,430 | King | Apr. 8, 1952 |
| 2,903,388 | Jonke et al. | Sept. 8, 1959 |
| 2,903,389 | Fujita | Sept. 8, 1959 |
| 2,904,003 | Cole | Sept. 15, 1959 |